March 16, 1937. H. L. MARTIN 2,074,298
TOURIST'S MAP HOLDER
Filed July 25, 1932 2 Sheets-Sheet 2

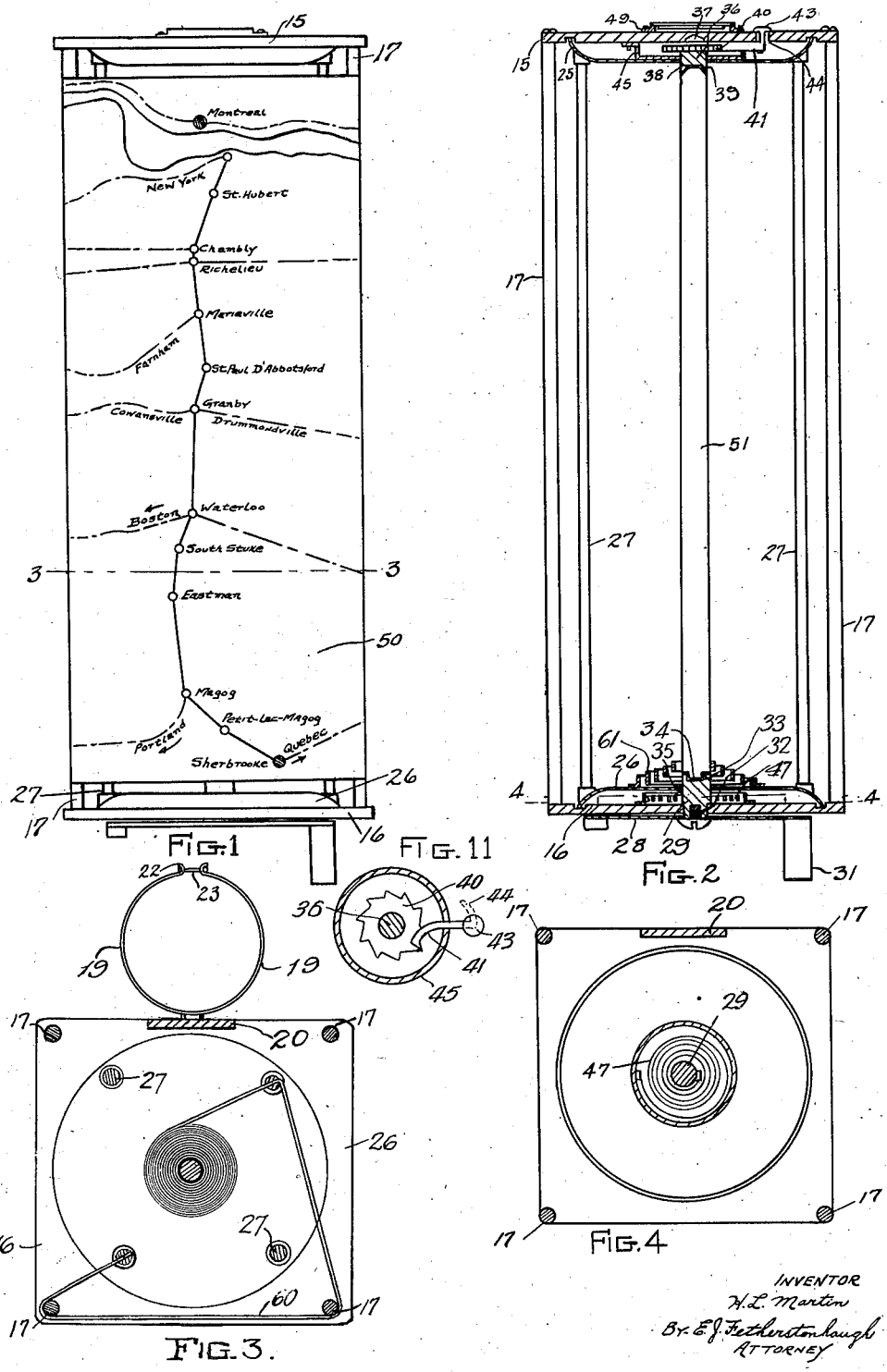

INVENTOR
H. L. Martin
BY E. J. Fetherstonhaugh
ATTORNEY

Patented Mar. 16, 1937

2,074,298

UNITED STATES PATENT OFFICE 2,074,298

TOURIST'S MAP HOLDER

Harry Lionell Martin, Cartierville, Quebec, Canada

Application July 25, 1932, Serial No. 624,517

5 Claims. (Cl. 40—89)

The invention relates to a tourist's map holder, as described in the present specification and illustrated in the accompanying drawings that form part of the same.

The invention consists essentially in the means employed in displaying map sections on a frame through successive rotary movements as pointed out in the claims for novelty following a description in detail of various features in connection with the construction of such a device.

The objects of the invention are to display to the motorist particulars of the road ahead in sectional maps which will take in the road for a considerable distance ahead, possibly fifty or sixty miles more or less; to turn these maps by means of rotary members, so that each map section will succeed the other throughout the length of the journey on that route, each route being numbered on the map as customary and appearing on separated sections which are displayed successively as the journey proceeds though it may be a continuous map reeled to disclose the highway on each point appearing as the map progresses; to facilitate the removal and replacement of maps in the holder, preferably to select a map by number and introduce it in the holder for reeling, wound on its own core, thereby enabling the motorist to read the map without experiencing the difficulties resulting from opening a map in the wind to the detriment of the map and to the annoyance of the reader; to insure simplicity and economy in so far as the construction of the holder is concerned; and generally to provide efficiency and durability in a device of this kind.

In the drawings, Figure 1 is a vertical elevational view of one form of holder showing a map mounted therein.

Figure 2 is a vertical elevational view showing the frame without the map.

Figure 3 is a cross sectional view on the line 3—3 in Figure 1.

Figure 4 is a cross sectional view on the line 4—4 in Figure 2.

Figure 11 is a plan view of the pawl and ratchet gear for holding the map in its extended position.

Like numerals of reference indicate corresponding parts in the various figures.

Figure 5:
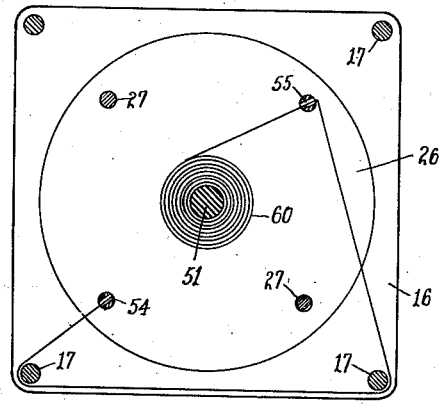
Figure 5 is a diagrammatic view showing the position of the map in relation to the front posts of the frame and the reeling member, for the first exposure.
Figure 6:
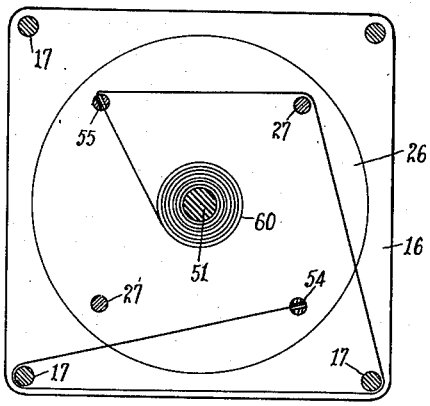
Figure 6 is a diagrammatic view showing the map advanced one space.
Figure 7:
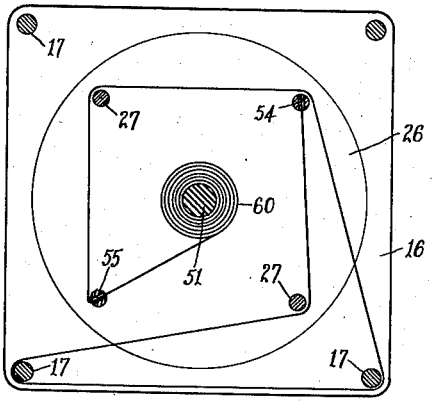
Figure 7 is a diagrammatic view showing the map advanced two spaces, in other words, showing the third map.
Figure 8:
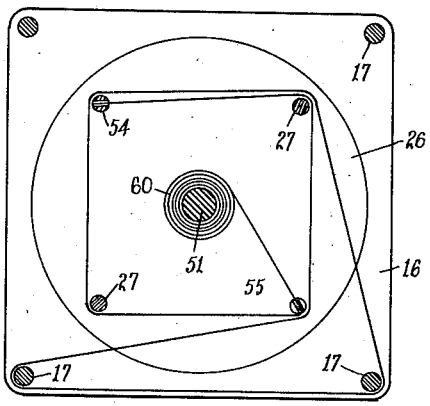
Figure 8 is a diagrammatic view showing the map advanced three spaces and showing the fourth map.
Figure 9:
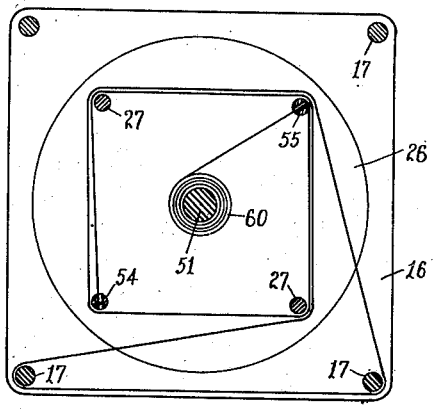
Figure 9 is a diagrammatic view showing the map advanced four spaces disclosing the fifth map.
Figure 10:
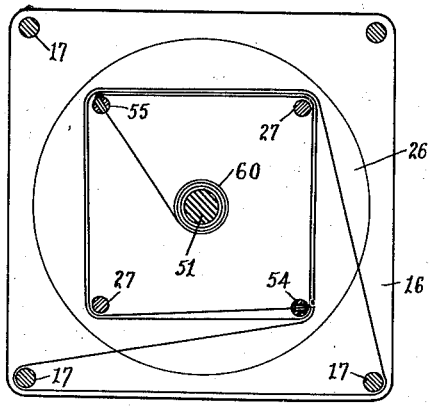
Figure 10 is a diagrammatic view showing the map advanced another space.

Referring to the drawings, the reel principle is adopted in operating maps of a particular kind, in which the sections of the roads are shown upright between certain places.

In the particular map in the illustration, the road section is from Montreal to Sherbrooke. Now, the next road section would show probably from Sherbrooke to Quebec. This is a particular type of map in which a number of panels show various sections in the distance and it is to keep moving these panels on, that this device has been made, and in general, it may be said that fundamentally, it is constructed on the principle of a fishing line reel, that perhaps will materially aid in the understanding of the operation of the reel.

The numeral 15 indicates the top plate of the frame, while the numeral 16 indicates the bottom plate. These plates are non-rotative and are joined at the corners by the posts 17 which are rigidly attached thereto.

The spring clamps 19 are rigidly secured to the bar 20 which in turn, is secured to the plates 15 and 16. The bolt 21 is inserted through the separated outwardly curved ends of the clamping members 19, and is secured around a steering column or other suitable place, by means of the drawing together of the ends 22, through the use of this bolt and nut fastening 23.

The reel plate 25 is at the upper end of the device under the plate 15, while the reel plate 26 is at the bottom end over the plate 16.

The plate 25 is joined to the plate 26 by the posts 27 and these form the reel which is turned by the crank 28, the latter being fixedly secured to the stub shaft 29 by the screw 30 in the reduced end of said shaft which forms a journal bearing in the plate 16, said crank having the handle 31. This stub shaft 29 has the socket end 33 forming a bearing and slotted at 34 to allow a map stick to be inserted.

The stub shaft 36 at the upper end of the map stick projects into a point bearing 37 in the plate 15 and is formed with a socket 38 at its inner end forming a bearing 39 for the upper end of the map stick. The ratchet 40 encircles the stub shaft 36 and turns therewith and this ratchet is engaged by the pawl 41 extending through the orifice 44 in the plate 15 and through the case 45 and this pawl is operated by the button 43 contacting with the click wheel or ratchet 40 and spring-held thereto, which is contained within the case 45, attached to the plate 15.

The spring 47 is mounted on the bottom plate 16 and engages with the stub shaft 29, putting tension on the reel when the crank is turned, while the spring 61 continues the tension from the reel plate 26 to a map stick 51, the spring 16 being mounted on the plate 26 at one end and hooked to the map stick at its other end.

The map stick 51 is mounted in the bearing 39 at the upper end, and at the other end 32 made to rotate in the socket 33. This map stick is readily removed from the socket 33 through the slot 34 and when fitted in place is made to engage with the spring 61.

The map 60 is wound on the stick and drawn out at the end and extended around the front fixed posts 17.

In one of the posts 27, there is a slit 54 for the end of the map, and in another post 27, there is a passage 55 for the map to pass through and on across the front posts 17.

The front of the map is exposed as shown in Figure 1, and as this map extends around three sides of a square, there will always be a map displayed in the front.

In the operation of this invention, the frame, as explained in the foregoing, is clamped to a post, or in fact, set up anywhere that will be most convenient to the driver of the car, and the map stick 51 having the map roll thereon is inserted between the stub shafts 36 and 29 and turns with the stub shaft 36, the crank 28 being fixedly secured to the reduced end of the stub shaft 29.

The stub shaft 29 rotates the end plate 26 and through the posts 27 rotates the plate 25, the plate 25 being free in its relation to the shaft 36. The stick 51 is rotated by drawing out the map through the rotation of the reel.

A map is disclosed across the front posts 17 and as has been explained, these maps are in vertical panels showing sections of highways.

The map indicated by the numeral 60, unrolls with the turning of the stick 51 against the tension of the spring 47, caused by the action of the reel in drawing out the map against the tension of the springs, but it cannot back up so long as the pawl 41 is in click engagement with the ratchet 40 and so long as the springs 47 and 61 maintain the map in tension. The map is rewound by releasing the pawl from engagement with the ratchet, allowing the spring to rotate the stick 51.

The diagrams clearly show the advancing of the different maps from, number one map onward, and in Figure 5 it will be seen that the map is first attached to one post of the reel. Naturally it has been explained that the map stick is put in the socket and is free to be drawn out. This map then extends around and across the two front posts and back again to the slotted posts of the reel. The turning of the reel effects the change in the map exposed, each fresh turn of the reel exposing another map, and during this turning of the reel, the map from the roll outwardly is kept in constant tension and clicks outwardly through the engagement of the pawl with the ratchet.

There is really nothing further to explain in this matter, as the diagrams show so exactly what becomes of the map as the reel continues to revolve, and so far as the exposures are concerned, it matters not how many maps there are, except that the frame and reel must be able to contain them.

What I claim is:

1. In a road directory, a frame, a reel suitably mounted in said frame, having spaced posts, a spring mounted on the frame and holding the reel in tension, a shaft mounted on said reel, a map on said shaft having its end threaded through one of said posts and about the front of the frame and attached to another of said posts and means for operating the reel.

2. In a road directory, a frame, a reel suitably mounted in said frame, having spaced posts, a spring mounted on the frame and holding the reel in tension, a shaft mounted on said reel, a map on said shaft having its end threaded through one of said posts and about the front of the frame and attached to another of said posts, means for operating the reel, and a ratchet and pawl holding the reel against the tension of the spring.

3. In a road directory, a frame having a band bracket secured thereto, top and bottom bearing plates and spaced posts, a wound map on a stick forming a shaft for rotation in said frame and a reel mounted in said frame, and operated to draw out said map in sections, a spring in tension holding said map across two front posts of the frame.

4. In a road directory, a frame having top, bottom and vertical members and central bearings at the upper and lower ends, a lower journal having a shaft socket and a crank handle and journalled in said lower bearing, an upper journal socket, a ratchet wheel mounted thereon and journalled in said upper bearing, a coacting spring-held pawl, a reel having spaced vertical posts joining upper and lower plates and a shaft removably held in said sockets, a coil spring at one end caught to said lower socket and at the other end to said frame, an adjustable pin slidable to and from said ratchet, a spring holding said pawl and a map carried by said shaft.

5. A road directory, comprising a stationary frame and a rotating frame journalled in said stationary frame, a map wound on a core independently rotatable in said rotating frame and displaying successively sections of highway and intersections and means for drawing out and spreading the map sections.

HARRY LIONELL MARTIN.